Dec. 5, 1933.          W. M. TEMPLETON          1,938,263
                       HARVESTING MACHINE
                       Filed March 18, 1926
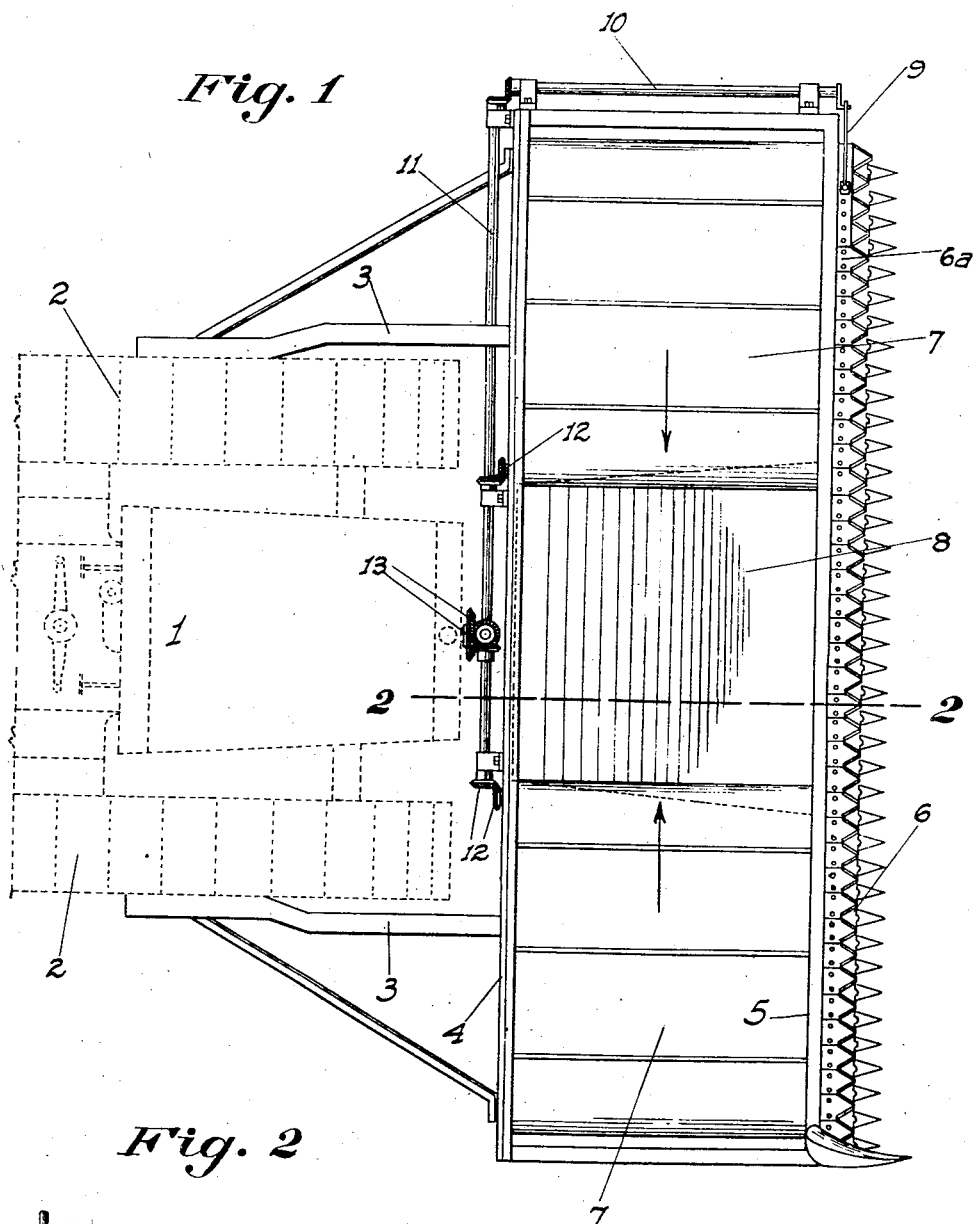
Fig. 1
Fig. 2
INVENTOR
Wm. M. Templeton
BY 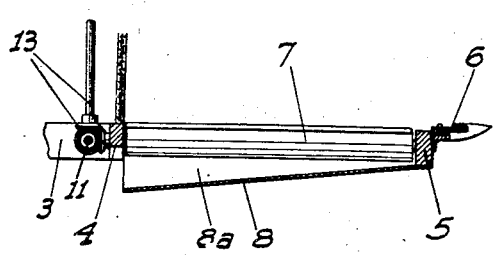
ATTORNEY Patented Dec. 5, 1933

1,938,263

UNITED STATES PATENT OFFICE 1,938,263

HARVESTING MACHINE

William M. Templeton, Willows, Calif.

Application March 18, 1926. Serial No. 95,616

16 Claims. (Cl. 56—23)

This invention relates to improvements in means for harvesting rice, my principal object being to provide an apparatus for the purpose by means of which a wide swath of grain will be cut at one time, and the cut grain will be left on the stubble behind the harvester in the form of a relatively narrow layer or windrow of continuous and unbroken extent.

Heretofore it has been customary to harvest rice in much the same manner as wheat and similar grains, by the use of a binder which automatically ties the grain as cut into bundles which are deposited on the field and later picked up for threshing.

The condition of rice when harvested is not dry however like other grain but is still green. The result of attempting to employ wheat harvesting methods to harvest rice therefore is that sweating and mildewing of the tied up bundles of rice soon sets in unless the bundles are frequently opened up to allow air to penetrate and the weather is extremely favorable. The rice harvesting season however is uncertain as to weather conditions and very frequently heavy rains or other unfavorable weather is had, almost inevitably resulting in the loss of a large percentage if not all of the cut crop. If, however, the cut rice is left so that air can freely circulate through and around the same, inclement weather if not too prolonged will not harm the grain, and if a few days warm weather prevails the crop will be efficiently dried.

My method of harvesting rice, as fully set forth in my co-pending application for patent, filed Jan. 14, 1927, Serial No. 161,106 contemplates laying the rice as cut on top of the stubble in the form of a continuous windrow so that air can circulate under the same through the stubble as well as having contact with the upper surface of the windrow. The windrow is wide compared to its depth so that a relatively great portion of the bulk of the grain will be directly exposed to the air and sun.

The width of the windrow is such that a tractor or other draft means behind the harvester will not touch the cut crop and press the same into the ground, but will leave it in properly suspended relation on the stubble. The width of the cut made on the standing grain must thus be wider than the windrow deposited on the ground, in order to allow for the passage of the tractor wheels or other ground engaging elements without touching the windrow, and also of course causes the windrows to be transversely separated from each other, thereby aiding in the circulation of air.

After the cut grain has been left on the stubble for the necessary length of time to dray, a combined rake and threshing mechanism may be run over the field, gathering up the grain and threshing it as the machine moves along. The time and labor incident to threshing operations may therefore be considerably lessened over what is had with the present methods.

My improved harvester has been devised to enable this method to be efficiently carried out, and its use not only reduces the cost of harvesting but insures the saving of practically all the crop after it is cut.

Further, the cut grain being kept clear of the ground, the subsequent picking up of the grain by a thresher is greatly facilitated.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a plan view of my improved harvester shown in connection with a tractor of any suitable type.

Fig. 2 is a cross section on the line 2—2 of Fig. 1.

Referring now more particularly to the characters of reference on the drawing, the numeral 1 denotes in general a tractor, preferably of a type having endless ground bearing tracks 2 rather than wheels.

Rigid beams 3 project forwardly from the sides of the tractor and are secured thereto. A transverse beam 4 considerably wider than the distance between the tracks 2, is connected to the forward ends of the beams 3. Another beam 5 is disposed parallel to the beam 4 and is located ahead of the same a distance somewhat greater than the length of the grain to be cut. The members 3, 4, and 5 are rigidly connected to each other to form a rigid horizontal frame structure.

Secured to and projecting ahead of the beam 5 is a mower structure of common form illustrated generally at 6, this structure extending the full length of the beam. Disposed between the beams 4 and 5 are drapers or conveyors 7. These drapers extend from the outer ends of the beams toward each other, but terminate short of each other a distance equal to the desired width of the windrow of grain to be left on the stubble, and which is less than the distance between the inner faces of the ground bearing members 2 of the tractor.

Secured to the members 4 and 5 under and between the drapers is a chute or apron 8 which may assume the form of a plate as shown, having sides 8a to prevent the grain from falling from the same laterally. The apron preferably has a smooth surface and is disposed with a downward slant toward its rear end, so that the lower end of the apron clears the beam 4 with an appreciable vertical space therebetween. Said apron is also preferably wider at its forward end than at its rear end, as indicated. This apron or plate 8 has a transverse straight edge to bend the stubble tops to a uniform elevation along a transverse line. This straight edge has a width corresponding to the width of the windrow to be laid so that the entire windrow is thus depressed but is sufficiently high to press only the tops of the stubble downwardly so that the pressed-over tops will be maintained in a uniformly elevated position.

The cutter sickle or knife bar 6a of the mower is driven in any suitable manner, such as by a pitman 9 driven from a longitudinal shaft 10 mounted at the adjacent end of the frame structure, this shaft itself being driven from a shaft 11 extending longitudinally of and mounted behind the beam 4. This shaft 11 also operates the drapers, by gearing connections 12 between said shaft and the drapers, these connections being so arranged that the upper surfaces of the drapers travel toward each other or toward the central chute. The shaft 11 in turn is driven from the tractor by suitable means such as gearing connections 13.

The various driving connections however are merely shown for the purposes of illustration, as it will be evident that various mechanisms may be employed for the same purpose, and such mechanisms of whatever character form no part of my invention.

In operation it will be seen that grain will be cut for the full width of the mower, the end portions of the grain being deposited onto the drapers and the central portion directly onto the apron. The drapers travelling toward the apron also, they will deliver their load onto the apron, so that the entire mass of cut grain will be concentrated at the apron. The apron sloping rearwardly toward the ground, the grain will slide off the apron with the forward travel of the harvester and will remain on the stubble in the form of an unbroken layer of definite width. It will be observed that the forward travel of the harvester acts to continuously withdraw the apron which supports the cut grain and thus permits the cut grain to be deposited on the stubble in a substantially quiescent condition. Also it will be observed that the apron acts to reduce the momentum of the cut grain as imparted to the grain by the movement of the drapers.

The apron not only serves as a means for delivering the grain onto the ground in a definite order, but causes the stubble to be deflected forwardly somewhat. It will be seen that, owing to the location of the apron or plate relative to the cutter bar and the inclination of the plate, the latter will apply a bending force to the upper part only of the stubble, thus forming a suspended or elevated flattened bed for the reception of the loose grain.

This is a very important feature, since it prepares the stubble to form a suitable supporting bed or mat for the cut grain, preventing the grain from dropping between the individual stubble-stalks onto the ground. The apron being wider at its front end than at its rear or delivery end, a greater width of stubble will be deflected than the actual width of the swath of grain as discharged. This provides for the proper support of all the grain, regardless of any slight spreading out of the windrow after it is free of the apron. It will be seen that as the grain is discharged from the end of the transversely moving draper or conveyer it will be deposited upon the plate and the momentum imparted to it by the transverse movement of the draper will be immediately relieved. The grain will then slide rearwardly from the plate upon the deflected tops of the stubble and be gently deposited on the elevated bed formed by such deflected tops, so as to avoid depositing the grain with such force as to cast it to the ground between the stubble. This deposit of the grain in substantially quiescent condition upon the tops of the bent over stubble is important in preserving the elevated, springy condition of the mat and the resulting aeratable position of the windrow.

While I have shown the delivery chute as being centrally disposed, it may be placed at either end of the mower, in which case one draper only would be used. In any event however the layer of grain deposited on the ground will be clear of the ground bearing members of the tractor so that the latter with its forward movement will not contact with the grain.

While I have specified the device as being particularly intended to handle rice, its use may be extended to the harvesting of other grain crops, as well as beans, alfalfa, etc.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A harvester including a mowing mechanism movable along the ground, a transverse draper mounted in connection with the mechanism to the rear of the same and on to which the grain cut by said mechanism is delivered, and an apron extending lengthwise of the direction of movement of the mowing mechanism mounted in connection therewith at the delivery end of the draper to receive the grain therefrom, said apron having a downward and rearward slant and delivering onto the ground at its rear end.

2. A windrow harvester comprising in combination, a sickle for cutting a crop, means to receive and move the cut crop to a point of discharge and for discharging the same in a windrow in back of and in a path narrower than the length of the sickle and between the ends thereof, and means at said point of discharge to retard the discharge of the crop so that it will be laid in the windrow in a relatively quiescent state.

3. A windrow harvester comprising in combination, a sickle for cutting a crop, means to receive and move the cut crop to a point of discharge and for discharging the same in a windrow in back of and in a path narrower than the length of the sickle and between the ends thereof, and means at said point of discharge to retard the discharge of the crop so that it will be laid in the windrow in a relatively quiescent state, said means additionally acting to deflect and so hold stubble while the windrow is laid thereon.

4. A windrow harvester comprising in combination, a sickle for cutting a crop, means to receive and move the cut crop to a point of discharge and for discharging the same in a windrow in back of and in a path narrower than the length of the sickle and between the ends thereof, and means at said point of discharge to bend over stubble in its path and to hold the stubble so bent over while the crop is discharged thereon in a windrow.

5. In a harvester, means to cut a crop, means to receive and convey the crop to a point of discharge, and means to receive the crop at said point and acting continuously to bend over stubble as the harvester travels through the field and for laying the crop thereon in a windrow, said means comprising a plate directly in back of the sickle between the ends thereof, and being of a width substantially less than the length of the sickle.

6. In a windrow harvester, cutting mechanism, a plate positioned to press stubble tops only to form the same into an aerating cushion support, said plate having a transverse straight edge to bend the stubble tops to a uniform elevation along a transverse line, said plate receiving the cut crop and being operable to deposit the same onto the aerating stubble mat in supported windrow formation.

7. A windrow harvester comprising, in combination, means for cutting the crop, and means embodying a straight edge for pressing down the tops only of the stubble so that said pressed-over tops will be maintained in an elevated position of substantially uniform height, said edge being of a width corresponding to the width of the windrow to be laid, whereby to form a raised springy stubble support capable of holding a windrow in aerating position above the ground, said pressing means receiving the cut crop and from which the crop is deposited in a windrow on such prepared stubble.

8. A windrow harvester comprising, in combination, means disposed transversely relative to the line of travel for cutting a crop, and means embodying a straight edge of a width substantially that of the windrow to be laid for pressing down the tops only of the stubble so that said pressed-over tops will be maintained in an elevated position of substantially transverse uniform height, whereby to form a raised springy stubble support capable of holding a windrow in aerating position above the ground, said pressing means receiving the cut crop and from which the crop is deposited in a windrow on such prepared stubble, and said pressing means being located behind and between the ends of said transversely disposed cutting means.

9. A windrow harvester comprising, in combination, means for cutting the crop, and means comprising a plate having a straight edge of predetermined width for pressing down the stubble tops only to a horizontal plane lower than the line of cut to form an aerating stubble support of substantially uniform height transversely, said pressing means receiving the cut crop and being operable to lay it on such preformed stubble whereby the windrow formed will be held raised above the ground to enable circulation of air thereunder.

10. A windrow harvester comprising, in combination, means disposed transversely relative to the line of travel for cutting a crop, and means comprising a plate having a straight edge for pressing down the stubble tops only to a horizontal plane lower than the line of cut to form an aerating stubble support of substantially uniform height transversely, said pressing means located behind and between the ends of the cutting means to receive the cut crop and being operable to lay it on such preformed stubble, whereby the windrow formed will be held raised above the ground to enable circulation of air thereunder.

11. A windrower comprising, in combination, means for cutting the crop, a plate corresponding in width substantially to that of the windrow to be laid for pressing down the stubble tops only below the line of cut along a plane transverse of the path of cut and of a width less than said path to form an elevated aerating stubble support to receive the cut crop, said plate also receiving the cut crop and operable to lay the same in a windrow on such prepared stubble support.

12. A windrow harvester comprising, in combination, means for cutting the crop to leave stubble, means for bending the stubble, means for conveying the loose cut crop material to the bending means, said bending means having a plane area serving as a support for the loose cut crop material, which bending means maintains the stubble in a bent condition and serves to lay the material on the stubble from said means.

13. A windrow harvester comprising a transverse header platform including a front beam, a plate carried by said beam, and a conveyer for moving the cut crop onto said plate, said plate being operable to deflect the stubble tops and lay the cut crop thereon in a windrow.

14. A windrow harvester comprising a transverse header platform, a conveyer thereon movable transversely to the direction of travel of the harvester, a receiving member located immediately below the discharge end of the conveyer and receiving the cut crop directly therefrom, said member operable to deflect stubble tops and lay the cut crop thereon.

15. A windrow harvester comprising a transverse header platform, a conveyer thereon, a plate mounted on the platform structure and located at the discharge end of the conveyer and held against downward movement relative to the header to receive the cut crop therefrom, said plate operable to deflect stubble tops only and lay the cut crop thereon in an aerating windrow.

16. A windrow harvester comprising a transverse header platform, a transverse conveyer thereon, a plate located immediately below the discharge end of the conveyer and held in a position against downward movement with respect to the header directly to receive the cut crop therefrom, said plate acting to deflect stubble tops only and being inclined rearwardly and downwardly to slide the cut crop onto the deflected stubble tops in an aerating windrow.

WILLIAM M. TEMPLETON.